United States Patent [19]

Miyake et al.

[11] 4,385,150

[45] May 24, 1983

[54] ORGANIC SOLUTION OF FLUORINATED COPOLYMER HAVING CARBOXYLIC ACID GROUPS

[75] Inventors: Haruhisa Miyake; Yoshio Sugaya; Tatsuro Asawa, all of Yokohama, Japan

[73] Assignee: Asahi Glass Company, Ltd., Tokyo, Japan

[21] Appl. No.: 309,775

[22] Filed: Oct. 8, 1981

[30] Foreign Application Priority Data

Oct. 17, 1980 [JP] Japan ................................ 55-144495

[51] Int. Cl.$^3$ ................................................ C08K 5/05
[52] U.S. Cl. .................................... 524/389; 524/104; 524/253; 524/354; 524/364
[58] Field of Search ............... 524/389, 104, 253, 354, 524/364

[56] References Cited

U.S. PATENT DOCUMENTS 3,873,437  3/1975  Pulver ................................... 204/254
4,124,458  11/1978  Moeglich ............................... 204/98

FOREIGN PATENT DOCUMENTS

| 270009 | 4/1981 | European Pat. Off. . |
| 29751 | 6/1981 | European Pat. Off. . |
| 2367782 | 5/1978 | France . |
| 2370062 | 6/1978 | France . |
| 2433592 | 3/1980 | France . |
| 2449733 | 9/1980 | France . |
| 53-159984 | 12/1978 | Japan ..................................... 214/18 |
| 2051870 | 1/1981 | United Kingdom . |

*Primary Examiner*—Joseph L. Schofer
*Assistant Examiner*—N. Sarofim
*Attorney, Agent, or Firm*—Oblon, Fisher, Spivak, McClelland & Maier

[57] ABSTRACT

An organic solution of a fluorinated copolymer having carboxylic acid groups comprises the copolymer of fluorinated ethylenically unsaturated monomer and a functional monomer having carboxylic acid group (—COOH group) dissolved in a hydrophilic organic solvent with a small amount of water.

5 Claims, No Drawings

ORGANIC SOLUTION OF FLUORINATED COPOLYMER HAVING CARBOXYLIC ACID GROUPS

BACKGROUND OF THE INVENTION

1. Field of the Invention

The present invention relates to an organic solution of a fluorinated copolymer having carboxylic acid groups. More particularly, it relates to a novel organic solution of a fluorinated copolymer having carboxylic acid groups (—COOH) dissolved in a hydrophilic organic solvent with a small amount of water, at high concentration.

2. Description of the Prior Art

Fluorinated polymers are usually durable to organic solvents and accordingly, organic solutions of the fluorinated polymer have not been substantially known. Especially organic solvents which can dissolve fluorinated polymers having many fluorine atoms bonded to each carbon atoms of a main chain skeleton have not been substantially known.

On the other hand, if such solution of the fluorinated polymer is obtained, various applications of the fluorinated polymers will be developed.

It has been noted that copolymers of a fluorinated olefin such as tetrafluoroethylene and a fluorinated monomer having carboxylic acid type group can be used for a cation exchange membrane having excellent oxidation resistance, chlorine resistance, alkali resistance and heat resistance which is used for producing an alkali metal hydroxide and chlorine, and also used for a membrane for a fuel cell and a membrane for dialysis and other uses. If an organic solvent solution of the carboxylic acid type fluorinated polymer can be obtained, the fabrication of the membrane is easily made whereby a membrane having a complicated configuration or a remarkably thin membrane can be obtained, or a membrane can be smoothly obtained by a dipping process, or pin holes of a membrane can be easily repaired, or a surface of a product can be easily coated by the fluorinated polymer. Various advantages are considered by the preparation of the solutions.

In the case of the fluorinated polymers having strong acidic groups having high polarity such as sulfonic acid groups, it has been known that the fluorinated polymer having only specific form such as sulfonic acid, sulfamide or sulfonate can be dissolved into a special organic solvent having high polarity as disclosed in Japanese Patent Publication No. 13,333/1973. Thus, in the case of the fluorinated polymer having carboxylic acid groups, the polymers can not be dissolved into the organic solvents for dissolving sulfonic acid type fluorinated polymer because of carboxylic acid group of the polymer.

The organic solvent solutions of carboxylic acid type fluorinated polymer have been found as disclosed in Japanese Unexamined Patent Publication No. 107949/1979 as the solutions of fluorinated polymer having carboxylic acid groups as —COOQ (Q: alkali metal atom) in an organic solvent having high polarity such as alcohols and glycols or Japanese Patent application No. 56912/1979 as the solutions of fluorinated polymer having pendant carboxylic ester groups in an organic fluorinated solvent such as trichlorotrifluoroethane and benzotrifluoride.

According to the studies, it is difficult to increase a concentration of the fluorinated polymer in such organic solvent solutions. Only the solution having a concentration of up to 5 wt. % has been obtained. It is preferable to increase the concentration of the fluorinated polymer in a fabrication of a membrane from the solution.

SUMMARY OF THE INVENTION

It is an object of the present invention to provide a process for preparing an organic solution of a fluorinated copolymer having carboxylic acid groups at high concentration.

It is another object of the present invention to provide a process for preparing an organic solution of a fluorinated copolymer which is used for fabrication of a membrane.

The foregoing and other objects of the present invention have been attained by providing an organic solution of a fluorinated copolymer having carboxylic acid groups which comprises the copolymer of fluorinated ethylenically unsaturated monomer and a functional monomer having carboxylic acid group (—COOH group) dissolved in a hydrophilic organic solvent with a small amount of water.

DETAILED DESCRIPTION OF THE PREFERRED EMBODIMENTS

The following interest results have been found by various studies for preparing a solution having high concentration. That is, carboxylic acid side chains of the carboxylic acid type fluorinated polymer are in the form of —COOH and the polymer is admixed with a hydrophilic organic solvent such as acetone, alcohols, and glycol ethers in the presence of a small amount of water, whereby excellent solubility is given to obtain a solution having a concentration of 20 wt. % or higher as unexpected result. This reason is not clear, however, it is considered that the incorporation of water highly affects the affinity of the fluorinated copolymer having carboxylic acid groups to the hydrophilic organic solvent since the fluorinated copolymer having carboxylic acid groups is not substantially soluble to the organic solvent.

In accordance with the present invention, organic solutions having a high concentration of up to about 40 wt. % can be obtained by using various hydrophilic organic solvents. Moreover, the physical and chemical stabilities of the solutions are excellent. The viscosity of the solution can be controlled as desired by selecting the solvent depending upon the object and use of the solution. Excellent films having no pinhole can be obtained by casting the organic solution.

In the present invention, it is important to use a monomer having carboxylic acid group as the functional monomer. The carboxylic acid type functional monomer (I) is preferably a fluorovinyl monomer in view of chlorine resistance and oxidation resistance of the resulting polymer. Suitable functional monomers are fluorovinyl monomers having the formula (I):

wherein l is 0 or an integer of 1 to 3; m is 0 or 1; n is 0 or an integer of 1 to 12; X represents —F or —CF$_3$; Y and Y' respectively represent F or a C$_{1-10}$ perfluoroalkyl group and A represents —COOH.

In view of characteristics and availability, it is preferable to be the monomer (I) wherein X represents —F; Y represents —$CF_3$; $Y'$ represents —F; l is 0 or 1; m is 0 or 1; n is 0 or an integer of 1 to 8.

Typical fluorovinyl monomers include:

$CF_2$=$CFO(CF_2)_{1-6}COOH$,
$CF_2$=$CFO(CF_2)_{1-6}COOH$,
$CF_2$=$CF(CF_2)_{0-8}COOH$, and
$CF_2$=$CFOCF_2CF(OCF_3)OCF_2CF_2COOH$.

The fluorinated ethylenically unsaturated monomers (II) can be tetrafluoroethylene, trifluorochloroethylene, hexafluoropropylene, trifluoroethylene, vinylidene fluoride and vinyl fluoride. It is preferable to use a fluorinated olefin having the formula $CF_2$=$CZZ'$ wherein Z and $Z'$ respectively represents —F, —Cl, —H or —$CF_3$, especially perfluoroolefins. It is optimum to use tetrafluoroethylene.

Two or more of the functional monomers (I) and two or more of the ethylenically unsaturated monomers (II) can be used.

It is possible to incorporate the other monomer such as olefins having the formula of $$CH_2=CR_4R_5$$

($R_4$ and $R_5$ respectively represent —H or a $C_1$-$C_8$ alkyl group or an aromatic ring); and fluorovinyl ethers having the formula $$CF_2=CFOR_f$$

($R_f$ represents a $C_1$-$C_{10}$ perfluoroalkyl group); and divinyl monomers such as $CF_2$=$CF$—$CF$=$CF_2$ and $CF_2$=$CFO(CF_2)_{1-4}$ $OCF$=$CF_2$; and the other functional monomers such as carboxylic acid type, sulfonic acid type functional monomers and mixtures thereof.

Suitable olefins (III) include ethylene, propylene, butene-1, isobutylene, styrene, α-methylstyrene, pentene-1, hexene-1, heptene-1, 3-methyl butene-1, 4-methyl pentene-1, etc. It is especially preferable to use ethylene, propylene or isobutylene in view of the production and characteristics of the resulting copolymers.

It is possible to improve mechanical strength of fabricated products such as films and membranes by incorporating a divinyl monomer etc. to crosslink the copolymer.

In the present invention, the carboxylic acid type fluorinated copolymer can be obtained by the copolymerization of the aforementioned monomers. Thus, the carboxylic acid groups can be in the form of —COOH when the copolymer is dissolved in the hydrophilic organic solvent with water.

Therefore, it is possible to produce the copolymer by using a functional monomer having the formula (I) wherein A represents —CN, —COF, —$COOR_1$, —COOM or —$COR_2R_3$ and $R_1$ represents a $C_{1-10}$ alkyl group, and $R_2$ and $R_3$ respectively represent —H or $R_1$; and M represents an alkali metal or quaternary ammonium group and to convert the carboxylic acid type group into —COOH by a hydrolysis or another method. The carboxylic acid type fluorinated copolymers can be also obtained by a reduction or oxidation of a fluorinated copolymer having functional groups other than carboxylic acid type groups such as sulfonic acid type groups to convert such functional groups as sulfonic acid groups into carboxylic acid type groups if necessary, further to convert into —COOH as disclosed in Japanese Unexamined Patent Publications No. 24175/1977, No. 24176/1977, No, 24177/1977, No. 132094/1978 and No. 132069/1978.

In the production of the carboxylic acid type fluorinated polymer of the present invention, the ratios of the functional monomer (I), the fluorinated olefin (II), the olefin compound (III) and the other monomer are important since the ratios relate to the characteristics of ion exchange membranes for electric cell or relate to the solubility to the hydrophilic organic solvent with a small amount of water and the stability of the resulting organic solution.

The amount of the functional monomer (I) directly relates to the ion exchange capacity and also relates to the stability of the organic solution and is preferably in a range of 5 to 40 mol % especially 10 to 30 mol %. When the ratio of the functional monomer (I) is too high, the mechanical strength of the ion exchange membrane made of the product is inferior and the ion exchange function is inferior because of the increase of water content whereas when the ratio of the functional monomer (I) is too low, the ion exchange function is not imparted. Moreover, the stability for maintaining the solution in the solubilization is disadvantageously inferior.

It is not clear why the carboxylic acid groups in the form of —COOH in the fluorinated copolymer and the presence of water in the organic solvent highly relate to the solubility and the stability of the solution. Thus, it is considered that the form of —COOH and the incorporated water highly affect the solubility to the hydrophilic organic solvent and the stability of the solution in view of the fact that the solubility is remarkably low in the other form of carboxylic acid such as an alkyl ester type or the solubility is not found in the hydrophilic organic solvent in the absence of water even though it is in the form of —COOH. The discussion is to illustrate the present invention without limiting the present invention.

The remainders of the copolymer of the invention beside the compound (I) are mainly the compounds (II), (III) and the other compound. The ratio of the olefin (III) is important since it highly relates to electrical and mechanical characteristics for the ion exchange membrane such as chlorine resistance. Therefore, when the olefin (III) is incorporated, the molar ratio of the olefin (III) to the fluorinated olefin (II) is in a range of 5:95 to 70:30 especially 10:90 to 60:40. When the fluorovinyl ether or divinyl ether is incorporated, the ratio of the compound is in a range of 30 mol % or less especially about 2 to 20 mol %.

In the preferable embodiment of the present invention, an ion exchange capacity is selected from the range of 0.5 to 2.2 meq/g. dry resin. In the characteristic feature, a molecular weight of the copolymer can be large even though the ion exchange capacity of large. Therefore the mechanical property and the durability of the copolymer are not lowered by increasing the ion exchange capacity. The ion exchange capacity is depending upon the kind of the copolymer and preferably 0.8 meq/g. dry resin or higher especially 1.0 meq/g. dry resin or higher in view of the mechanical characteristics and electrochemical characteristics.

The molecular weight of the carboxylic acid type fluorinated polymer of the present invention is important since it relates to the mechanical characteristics and the fabricatability of the membrane. It is preferably to have $T_Q$ of higher than 150° C. preferably 170° to 340° C. especially about 180° to 300° C.

In the specification, $T_Q$ is defined as follows. The temperature for a volumetric melt flow rate of 100 mm$^3$/sec. is defined to T$_Q$ which relates to the molecular weight of the copolymer. The volumetric melt flow rate is defined to the unit of m$^3$/sec. of the flow rate of the molten copolymer extruded through the orifice having a diameter of 1 mm and a length of 2 mm at a specific temperature under a pressure of 30 kg/cm$^2$.

An ion exchange capacity of a cation exchange membrane was measured as follows.

A H-type cation exchange membrane was immersed into 1N-HCl at 60° C. for 5 hours to completely convert into H-type membrane, and then, the membrane was washed with water so as to be free of HCl. Then, 0.5 g. of the H-type membrane was immersed into a solution prepared by adding 25 ml of water to 25 of 0.1N-NaOH. Then, the membrane was taken out and the amount of NaOH in the solution was measured by a back titration with 0.1N-HCl.

Various hydrophilic organic solvents can be used in the present invention. It is preferable to use water miscible organic solvents especially miscible of water at a content of 0.5 wt. % or more. Suitable solvents include alcohols, ketones, organic acids, aldehydes and amines. It is also possible to use hydrophilic organic solvents which have high affinity to water even though the solubility to water is not so high. These solvents include pyrrolidones, esters and ethers. A mixed solvent can be used. In the present invention, a small amount of water is incorporated into the hydrophilic organic solvent. The content of water is in a range of about 0.001 to 30 wt. % preferably about 0.05 to 20 wt. % based on the organic solvent.

When the specific carboxylic acid type fluorinated copolymer is dissolved in the solvent, a predetermined amount of the specific fluorinated copolymer is mixed with the solvent, if necessary by a conventional process for promoting the dissolution such as heating and stirring. The form of the specific fluorinated copolymer can be a form of mass, film, sheet, fiber, rod and pellet. In view of the acceleration of the dissolution, it is preferably in a form of a powder or granule of a mesh of 20 or more. In the dissolution, the temperature is preferably higher and is usually in a range of 20° to 250° C. preferably 30° to 150° C. It is possible to dissolve it under the pressure of 1 to 10 atm. to accelerate the dissolution.

In accordance with the present invention, it is possible to give high concentration of the organic solvent as 40 wt. % and it is usually in a range of 5 to 30 wt. % preferably 10 to 25 wt. %.

The viscosity of the organic solution is varied from 10 cps to 10$^6$ cps depending upon a concentration of the solution and a kind of the hydrophilic organic medium. In the purpose of the preparation of a film of the copolymer by a casting etc., it is usually in a range of 100 cps to 10,000 cps.

The organic solution obtained by the process of the present invention can be used for various purposes and uses. It is possible to give high concentration as 40 wt. % and accordingly, the usages of the organic solution are broad and effective. The organic solution can be fabricated into a film and a sheet having a desired shape used for electrolysis, dialysis and a fuel cell by casting the organic solution or impregnating it into a porous substrate made of asbestos or polytetrafluoroethylene and evaporating the hydrophilic organic solvent. Moreover, the organic solution is remarkably effective for repairing pin holes and teared parts of the resulting film or the other film for membranes. The organic solution can be also effectively used for coating a surface of a substrate such as a spaces net and an electrode.

A further understanding can be obtained by reference to certain specific examples which are provided herein for purposes of illustration only and are not intended to be limiting unless otherwise specified. In the examples, the part means part by weight otherwise specified.

EXAMPLE 1

A carboxylic acid type copolymer having an ion exchange capacity of 1.92 meq/g. polymer was obtained by hyrolyzing a copolymer obtained by a bulk polymerization of C$_2$F$_4$ and CF$_2$=CFO(CF$_2$)$_3$COOCH$_3$ at 40° C. under a pressure of 6.7 kg/cm$^2$ with an initiator of diisopropyl peroxydicarbonate. To 20 g. of the polymer were added 2 g. of water and 178 g. of acetone and the mixture was stirred at room temperature for 16 hours to obtain a uniform transparent solution having a concentration of 10 wt. % and a viscosity of 500 cp. A uniform transparent solution having a concentration of 20 wt. % and a viscosity of 10,000 cps was also obtained by dissolving 40 g. of the copolymer in a mixture of 156 g. of acetone and 4 g. of water. Excellent film of the copolymer was obtained by casting each of the solutions at 30° C.

EXAMPLE 2

To 20 g. of the copolymer of Example 1 were added 20 g. of water and 160 g. of diethyleneglycol and the mixture was stirred for 16 hours to obtain a solution having a concentration of 10 wt. %. The solution was casted at 60° C. to obtain excellent film of the copolymer.

EXAMPLE 3

To 40 g. of the copolymer of Example 1 were added 20 g. of water and 140 g. of methyl acetate or methanol and each mixture was stirred to obtain each transparent solution having a concentration of 20 wt. % and a viscosity of 8,000 cps. Each solution was casted at 30° C. to obtain each excellent film.

EXAMPLE 4

To 20 g. of the copolymer of Example 1 were added 1 g. of water and 180 g. of dimethylformamide or dimethylsulfoxide and each mixture was stirred to obtain each solution having a concentration of 10 wt. % and a viscosity of 200 cps. Each solution was casted at 60° C. to obtain each excellent film.

EXAMPLE 5

A carboxylic acid type copolymer having an ion exchange capacity of 1.45 meq/g. was obtained by hydrolyzing a copolymer obtained by an emulsion copolymerization of C$_2$F$_4$ and CF$_2$=CFO(CF$_2$)$_3$COOCH$_3$ at 57° C. under a pressure of 11 kg./cm$^2$ with a surfactant of C$_8$H$_{17}$COONH$_4$ and an initiator of (NH$_4$)$_2$S$_2$O$_3$.

To 20 g. of the resulting copolymer were added 4 g. of water and 76 g. of acetone and the mixture was stirred for 40 hours to obtain a solution having slight turbidity and a concentration of 20 wt. % and a viscosity of 9000 cps. The solution was casted at 60° C. to obtain excellent film.

EXAMPLE 6

In accordance with the process of Example 1, a carboxylic acid type copolymer having an ion exchange capacity of 1.68 meq/g. was obtained by hydrolyzing a copolymer obtained by a copolymerization of C$_2$F$_4$ and $CF_2=CFO(CF_2)_3COOCH_3$ and

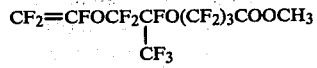

(molar ratio of 70:30).

To 20 g. of the resulting copolymer were added 2 g. of water and 88 g. of acetone and the mixture was stirred to obtain a solution having a concentration of 10 wt. %. The solution wa casted to obtain excellent film.

We claim:

1. A process for preparing a solution comprising mixing the polymer of fluorinated ethylenically unsaturated monomer selected from the group consisting of tetrafluoroethylene, trifluorochloroethylene, hexafluoropropylene, trifluoroethylene, vinylidene fluoride and vinyl fluoride and a functional monomer having a carboxylic acid group (—COOH group) with a hydrophilic organic solvent selected from the group consisting of alcohols, ketones, organic acids, aldehydes and amines, containing 0.001 to 30 weight percent of water to form a solution.

2. The process according to claim 1 wherein said functional monomer is a compound having the formula

wherein l is 0 or an integer of 1 to 3; m is 0 or 1; n is 0 or an integer of 1 to 12; X represents —F or —CF$_3$ or Y and Y' respectively represent F of a C$_{1-10}$ perfluoroalkyl group; and A represents —COOH.

3. The process according to claim 1 wherein said fluorinated ethylenically unsaturated monomer is a fluorinated olefinic compound having the formula $CF_2=CZZ'$ wherein Z and Z' respectively represent —F, —Cl, —H or —CF$_3$.

4. The process according to claim 2 wherein said functional monomer is a fluorovinyl compound having the formula

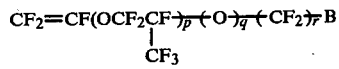

wherein p is 0 or 1; q is 0 or 1; r is 0 or an integer of 1 to 8; and B is —COOH.

5. The process according to claim 3 wherein said fluorinated ethylenically unsaturated monomer is tetrafluoroethylene.

* * * * *